United States Patent [19]
Reinartz

[11] 3,989,056
[45] Nov. 2, 1976

[54] COMPENSATING RESERVOIR FOR A MULTI-CIRCUIT HYDRAULIC BRAKE SYSTEM

[75] Inventor: Hans-Dieter Reinartz, Frankfurt-Hausen, Germany

[73] Assignee: ITT Industries, Inc., New York, N.Y.

[22] Filed: Sept. 10, 1975

[21] Appl. No.: 612,079

[30] Foreign Application Priority Data
Oct. 12, 1974  Germany............................ 2448680

[52] U.S. Cl. ............................... 137/574; 137/576; 137/265; 60/585
[51] Int. Cl.² .......................................... F15B 7/08
[58] Field of Search ........... 137/571, 574, 576, 265; 60/585, 586, 587, 588, 589

[56] References Cited
UNITED STATES PATENTS
3,744,513  7/1973  Leitenberger.................. 137/265 X
FOREIGN PATENTS OR APPLICATIONS
937,991  1/1956  Germany............................ 137/265

Primary Examiner—William R. Cline
Attorney, Agent, or Firm—John T. O'Halloran; Alfred C. Hill

[57] ABSTRACT

The reservoir includes a housing, a separating wall in the housing in the transverse direction of the vehicle to provide two chambers, each of the two chambers being divided by a partition in the longitudinal direction of the vehicle into a large and a small chamber compartments. The two chambers are interconnected by a first port in the partition of one of the two chambers spaced from the separating walls interconnecting the large and small chamber compartments of the one of the two chambers, the small chamber compartment of the one of the two chambers, a second port in the separating wall interconnecting the small chamber compartment of the one of the two chambers with the small chamber compartment of the other of the two chambers and a third port in the partition of the other of the two chambers spaced from the separating wall interconnecting the large and small chamber compartments of the other of the two chambers. This arrangement is very cheap to manufacture and prevents undue amounts of brake fluid flow from one chamber to the other chamber when braking or accelerating the vehicle or when driving uphill or downhill.

7 Claims, 2 Drawing Figures

COMPENSATING RESERVOIR FOR A MULTI-CIRCUIT HYDRAULIC BRAKE SYSTEM

BACKGROUND OF THE INVENTION

This invention relates to a compensating reservoir for a multi-circuit hydraulic brake system which includes at least two chambers segregated one from the other by a separating wall and interconnected at the level of a minimum admissible fluid level, with at least one port of the interconnection being in a spaced relationship to the separating wall. Such a compensating reservoir is known from the German unexamined published patent application DT-OS No. 2,027,712 and from the German examined published patent application DT-AS No. 1,655,427.

The spaced arrangement of the port of the passage means interconnecting the two chambers of the compensating reservoir, relative to the separating wall, is to ensure that no undue amount of brake fluid is allowed to flow from one chamber into the other chamber when braking or accelerating the vehicle in which the multi-circuit brake system including the compensating reservoir is installed, or when driving uphill, thereby causing a faulty warning indication to be given or, even worse, air being drawn into one of the brake circuits.

The disadvantage of the compensating reservoir of FIG. 1 of DT-OS No. 2,027,712 lies in that the pipe interconnecting the two chambers must be mounted very accurately parallel to the bottom of the reservoir; otherwise, the desired filling level when the warning signal is activated will not be maintained. The installation of such a pipe into the separating wall is expensive since compensating reservoirs are usually manufactured by injection moulding. An additional operation is required to insert the pipe into the separating wall. The last-named disadvantage also applies to the compensating reservoir of DT-AS No. 1,655,427.

SUMMARY OF THE INVENTION

It is the object of the present invention to provide a compensating reservoir of the type initially referred to which permits the cheapest possible manufacture in one single operation as an injection-moulded member.

A feature of the present invention is the provision of a compensating reservoir for a multi-circuit hydraulic brake system comprises: a housing; a separating wall disposed in the housing to provide two chambers; a partition disposed in at least one of the two chambers extending in a transverse relationship to the wall to divide the one of the two chambers into two chamber compartments; and an interconnection between the two chambers at the minimum admissible fluid level including a first port in the partition remote from the wall interconnecting the two chamber compartments of the one of the two chambers, one of the two chamber compartments, and a second port in the wall interconnecting the one of the two chamber compartments and the other of the two chambers.

Apart from the low manufacturing costs, the advantages of the present invention also lie in the high accuracy of the filling level present when the warning signal is given, without necessitating high manufacturing accuracies. The partitioned chamber may be designed very small, thereby ensuring sufficient space for the installation of a conventional warning arrangement with floats in the other chamber compartment.

An advantageous embodiment of this invention is that the partition is provided in but one chamber of the compensating reservoir. Such an arrangement is useful if the compensating reservoir requires a inclined arrangement in the vehicle and if there is danger of fluid spillage only from one chamber over into the other chamber, and not vice versa. The arrangement of one single partition does not affect the space available in the chamber having no partition. It permits the installation of the conventional warning arrangement with float into that chamber without necessitating a design change, compared to conventional compensating reservoirs.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
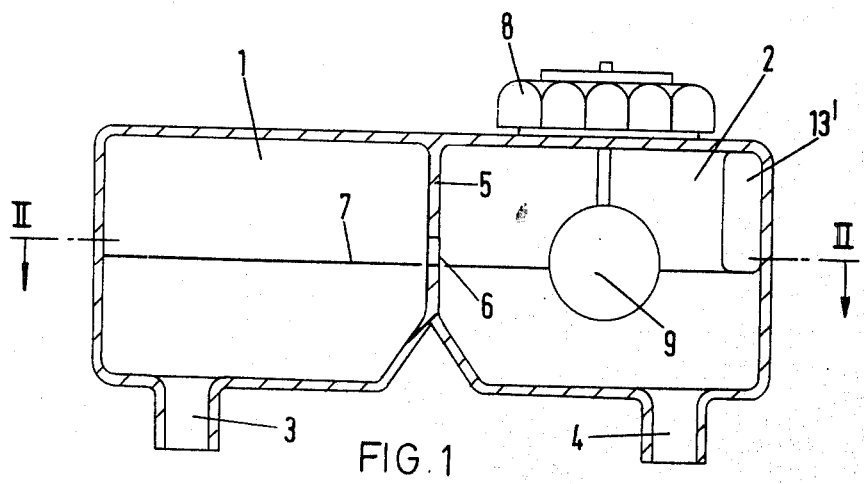
FIG. 1 is a longitudinal cross-sectional view of the compensating reservoir constructed in accordance with the principles of the present invention along the line I—I of FIG. 2.
Figure 2:
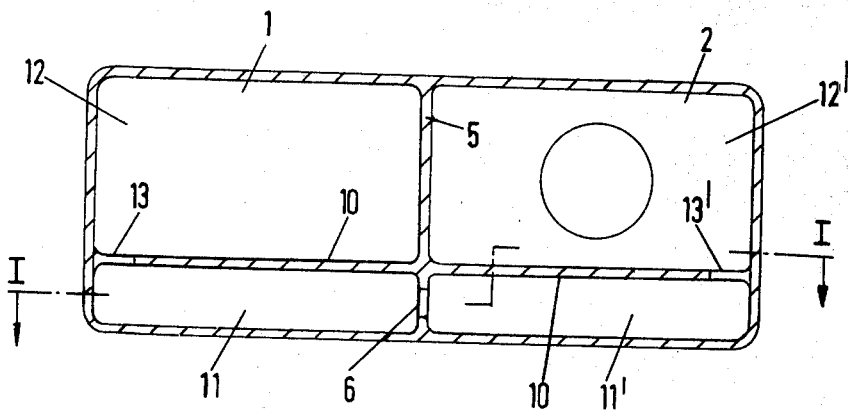
FIG. 2 is a longitudinal cross-sectional view of the compensating reservoir constructed in accordance with the principles of the present invention along the line II—II of FIG. 1.

The compensating reservoir illustrated in FIGS. 1 and 2 comprise two chambers 1 and 2, each having, respectively, an outlet branch 3 and 4 leading to a master cylinder of a multi-circuit hydraulic brake system not shown. The two chambers 1 and 2 are segregated one from the other by a separating wall 5 in the transverse direction of the vehicle in which the reservoir is installed. A passageway 6 is disposed in the separating wall 5. Passageway 6 is arranged at such a level that the fluid is kept within a minimum admissible fluid level 7 in case one of the chambers 1 and 2 becomes depleted. Owing to passageway 6 providing intercommunication between the two chambers 1 and 2, it will suffice to screw off only one cover 8 for opening the compensating reservoir to add fluid thereto.

Disposed in chamber 2 is a float 9 which constitutes a component of a warning arrangement, not shown, in reservoir cover 8.

An essential feature of this invention is a partition 10 in the longitudinal direction of the vehicle in which the reservoir is installed dividing each of the two chambers 1 and 2 into two small chamber compartments 11 and 11', respectively, and two large chamber compartments 12 and 12', respectively. Ports 13 and 13', respectively, are provided at the ends of partition 10 remote from separting wall 5. When viewing from reservoir cover 8, ports 13 and 13' extend precisely up to the same fluid level 7 as passageway 6.

The operation of the compensating reservoir as decribed herein is as follows. Assume first that a small, but even, loss of fluid occurs in the course of time in both brake circuits. As soon as the fluid level 7 has dropped to the lower edge of passageway 6, float 9 will cause a warning signal to be generated. Assume further that loss of fluid occurs only in chamber 2 after the system has first been operating correctly. This will cause the fluid level in chamber 1 to drop to the level of passageway 6. The float 9 in chamber 2 will release the warning signal. As a next possibility, assume that a defect in chamber 1 causes it to be depleted completely. Fluid from chamber 2 will flow into chamber 1 through passageway 6 and will be lost similarly. The float 9 will cause a warning signal to be generated. The fluid level 7 in chamber 2, however, will not drop below the level of passageway 6.

When driving up- or downhill or during panic braking or rapid acceleration, it will hardly be possible for fluid to flow from one chamber into the other chamber because port 13 of chamber compartment 11 defined by partition 10 in chamber compartment 12 lies far away from separating wall 5. Assume, for instance, that the vehicle drives uphill, thereby causing the left chamber 1, when viewing the drawing to be raised relative to the horizontal. The raising of chamber 1 will cause the position of port 13 to raise simultaneously. In this case, fluid will not be allowed to flow from chamber compartment 12 into chamber compartment 11 through port 13 and onwards through the passageway 6 into chamber compartments 11' and 12', respectively. Only the fluid in chamber compartment 11 will be allowed to flow partly into the other chamber 2 through passageway 6. However, since chamber compartment 11 has a low volume, such fluid transfer does not adversely affect the brake system.

While I have described above the principles of my invention in connection with specific apparatus it is to be clearly understood that this description is made only by way of example and not as a limitation to the scope of my invention as set forth in the objects thereof and in the accompanying claims.

I claim:

1. A compensating reservoir for a multi-circuit hydraulic brake system comprising:
   a rectangular-like housing having enclosing walls;
   a single separating wall disposed in said housing, said separating wall being connected to given ones of said enclosing walls to provide two separate enclosed chambers within said housing;
   a single partition disposed in at least one of said two chambers extending in a transverse relationship to said separating wall, said partition being connected to said separating wall, certain ones of said given ones of said enclosing walls and others of said enclosing walls transverse to said given ones of said enclosing walls to divide said one of said two chambers into two separate enclosed chamber compartments; and
   an interconnection between said two chambers at the minimum admissible fluid level including
   a first port in said partition remote from said separating wall, said first port interconnecting said two chamber compartments of said one of said two chambers,
   one of said two chamber compartments, and
   a second port in said separating wall, said second port interconnecting said one of said two chamber compartments and the other of said two chambers.

2. A reservoir according to claim 1, wherein
said partition is disposed in both of said two chambers in a transverse relation to said separating wall, said partition being connected to both sides of said separating wall, certain ones of said given ones of said enclosing walls defining said both of said two chambers and others of said enclosing walls transverse to said given ones of said enclosing walls defining said both of said two chambers to divide each of said two chambers into two separate enclosed chamber compartments, and
said interconnection further includes
   one of said two chamber compartments of said other of said two chambers associated with said second port, and
   a third port in said partition of said other of said two chambers remote from said separating wall, said third port interconnecting said two chamber compartments of said other of said two chambers.

3. A reservoir according to claim 2, wherein
said first port and said third port are disposed at opposite ends of said partition adjacent ones of said others of said enclosing walls defining said both of said two chambers of said housing, said first and third ports being spaced from said separating wall.

4. A reservoir according to claim 3, wherein
said one of said two chamber compartments of said one of said two chambers and said one of said two chamber compartments of said other of said two chambers are smaller than the other of said two chamber compartments of said one of said two chambers and the other of said two chamber compartments of said other of said two chambers.

5. A reservoir according to claim 1, wherein
said first port is disposed at an end of said partition adjacent said others of said enclosing walls of said housing, said first port being spaced from said separating wall.

6. A reservoir according to claim 5, wherein
said one of said two chamber compartments is smaller than the other of said two chamber compartments.

7. A reservoir according to claim 1, wherein
said one of said two chamber compartments is smaller than the other of said two chamber compartments.

* * * * *